No. 710,017. Patented Sept. 30, 1902.
F. SCHMITZ.
BANANA SHIPPING CASE.
(Application filed Jan. 22, 1902.)
(No Model.)
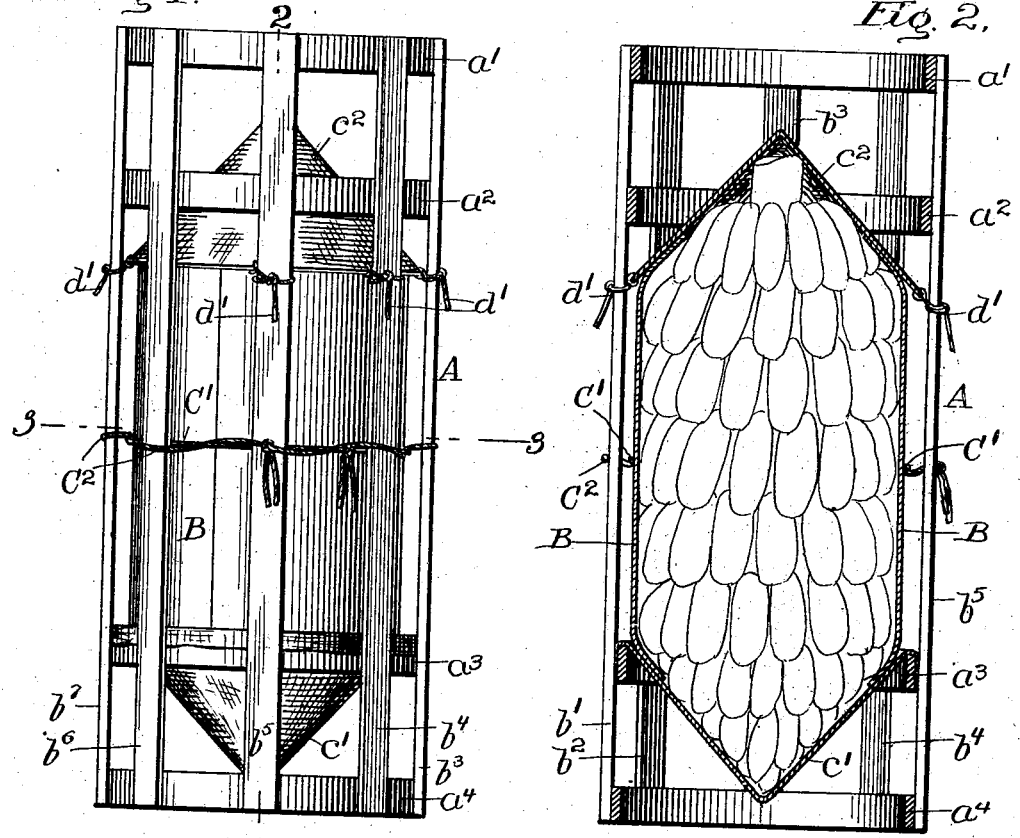
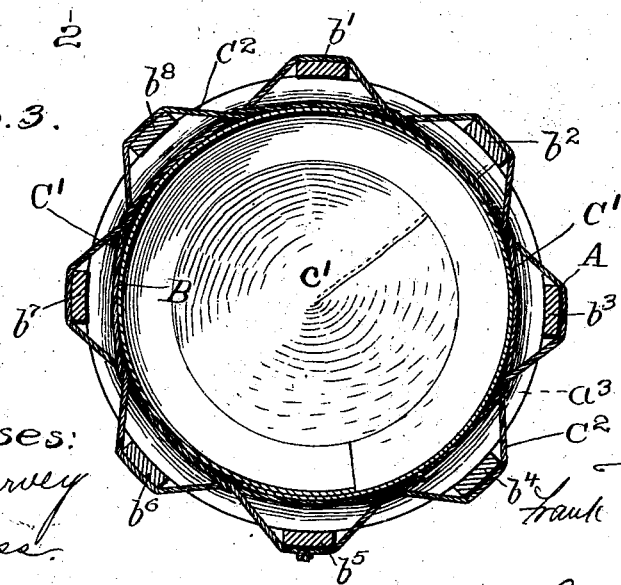
Witnesses:
Chas. O. Shurvey
S. Bliss
Inventor:
Frank Schmitz
by H. Bitner, Atty.

UNITED STATES PATENT OFFICE.

FRANK SCHMITZ, OF CHICAGO, ILLINOIS.

BANANA-SHIPPING CASE.

SPECIFICATION forming part of Letters Patent No. 710,017, dated September 30, 1902.

Application filed January 22, 1902. Serial No. 90,735. (No model.)

*To all whom it may concern:*

Be it known that I, FRANK SCHMITZ, a citizen of the United States of America, residing at Chicago, in the county of Cook and State of Illinois, have invented certain new and useful Improvements in Banana-Shipping Cases, of which the following is a specification.

My invention relates to certain new and useful improvements in banana-shipping cases.

Its object is to provide a crate which combines with perfect ventilation, cheapness, and lightness a perfect cushioning for the inclosed fruit.

To this end my invention relates to certain novel features of construction, which will be fully described in the specification, and the essential features of which will be pointed out in the claims.

In the drawings, Figure 1 represents a side elevation of my improved banana-shipping case. Fig. 2 represents a longitudinal section in the line 2 2 of Fig. 1. Fig. 3 represents a transverse section in the line 3 3 of Fig. 1.

Referring to the drawings, A represents the crate proper, composed of the transverse hoops $a'$ $a^2$ $a^3$ $a^4$ and the longitudinal bars $b'$ $b^2$ $b^3$ $b^4$ $b^5$ $b^6$ $b^7$ $b^8$. Within this crate proper is suspended the funnel-shaped bottom $c'$, preferably secured between the hoop $a^3$ and the longitudinal bars. A conical top $c^2$ is adapted to be secured in the crate by means of the knotted strings $d'$. The top and bottom will effectually center the fruit with respect to the case. Within the crate proper is suspended the elastic tubular casing B, which closely clasps the fruit and protects it from injury. This casing is preferably made of some stiff substance—such as heavy paper, pasteboard, papier-mâché, or the like—which is stiff enough to protect the fruit from injury.

The elastic tubular casing B, clasping a bunch of bananas, is held in place in the following manner: It is first rolled about a bunch of bananas and drawn tight by means of the string $C'$, fastened around it. The string $C'$ is then knotted, holding the tubular casing tightly about the bunch. The bunch is then placed within the crate, being centered by the conical bottom $c'$, the top $c^2$ is pulled down over it, centering the top, and the tubular casing is then firmly fixed in the middle of the crate by means of the cord $C^2$, passing alternately over the longitudinal bars and under the encircling cord, as shown in Fig. 3. By this means the bunch of bananas is held firmly in place in the center of the crate and entirely out of contact with the walls thereof. The fruit is therefore perfectly protected from injury.

While the cord $C^2$ has been shown and described as passing over the longitudinal bars of the crate, it is obvious that it may be passed around the hoops adjacent to the casing and under the cord $C'$ with the same effect as when passed around the longitudinal bars.

It is obvious that the elastic tubular casing when held properly in place by the encircling cord is, in effect, a cylindrical box so adjustable in diameter as to fit bunches of bananas of any size. The encircling cord draws the casing to the desired size, forcing it into as small a circle as may be needed, while the elasticity of the casing renders the cylinder rigid by pressing outward against the cord. This rigidity of the cylinder effectually protects the bananas against any cutting-pressure of the cord, such as would be present if the casing were of any flexible material like ordinary woven fabric, and the elasticity of the casing is thus an essential feature of the device. It is apparent that the encircling cord performs a double function, since it holds the cylinder in close contact with the bananas and also affords a convenient point of attachment for the centering-loops.

I claim as new and desire to secure by Letters Patent—

1. In a banana-shipping case, the combination with a suitable open crate, of an elastic tubular casing, a top and bottom therefor, a cord encircling said casing, and a second cord laced alternately over members of the crate and under the encircling cord; substantially as described.

2. In a banana-shipping case, the combination with a suitable open crate, of conical top and bottom pieces suspended therein, and an elastic tubular casing secured around the bananas by means of an encircling cord, and centered in the casing by means of a cord laced alternately over the slats and under the encircling cord; substantially as described.

3. In a banana-shipping case, the combination with a suitable open crate, of an elastic tubular casing, a cord encircling the casing and adapted to hold it firmly in place about a bunch of bananas and a series of loops running from said encircling cord to the members of said crate and adapted to center the casing in the crate; substantially as described.

In witness whereof I have hereunto set my hand, at Chicago, in the county of Cook and State of Illinois, this 8th day of November, A. D. 1901.

FRANK SCHMITZ.

Witnesses:
CHAS. O. SHERVEY,
S. BLISS.